No. 757,126. PATENTED APR. 12, 1904.
E. M. KELLOGG.
GRAIN HARVESTER.
APPLICATION FILED MAR. 4, 1899.
NO MODEL. 3 SHEETS—SHEET 2.
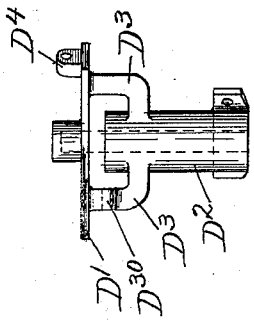
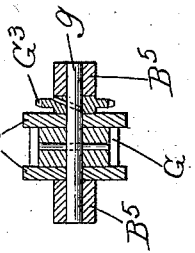
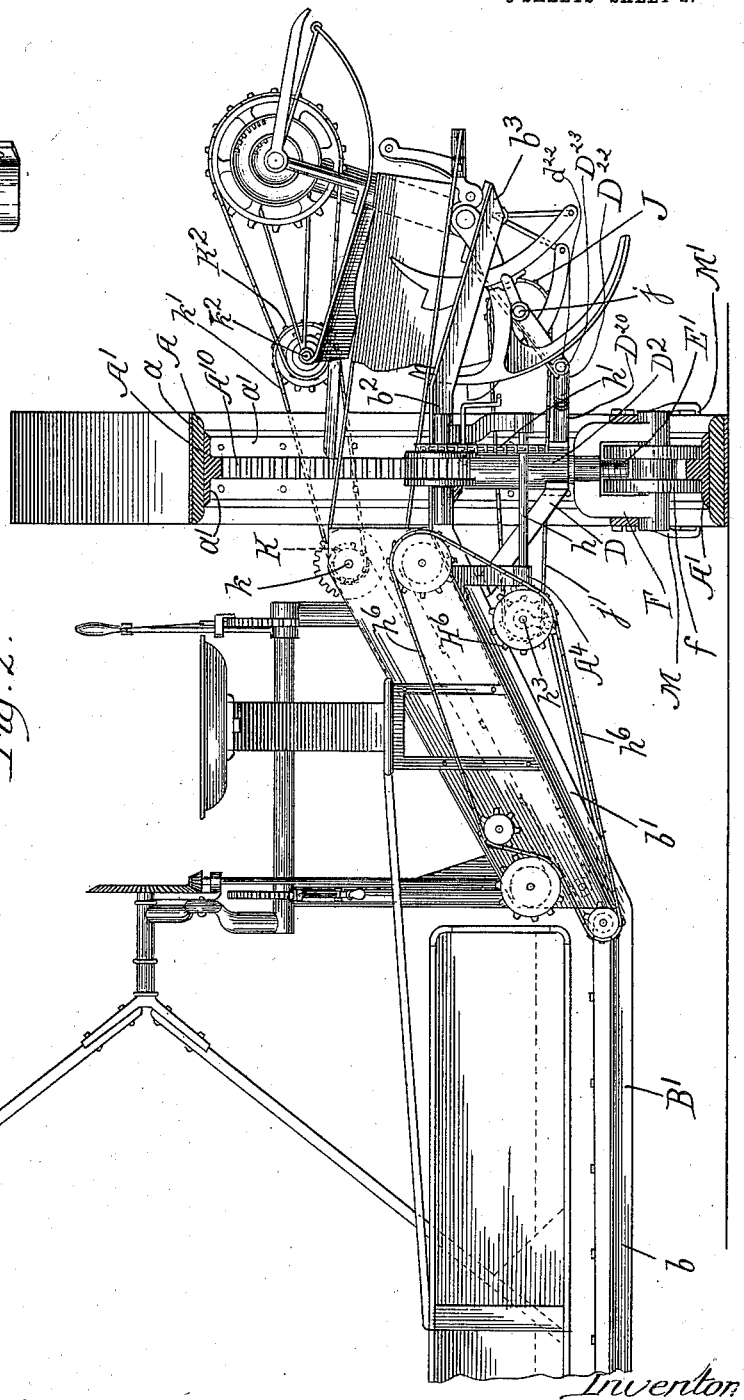
Witnesses:
Frank S. Blanchard
Edward T. Wray.
Inventor
Edwin M. Kellogg
By Attorneys Burton and Burton

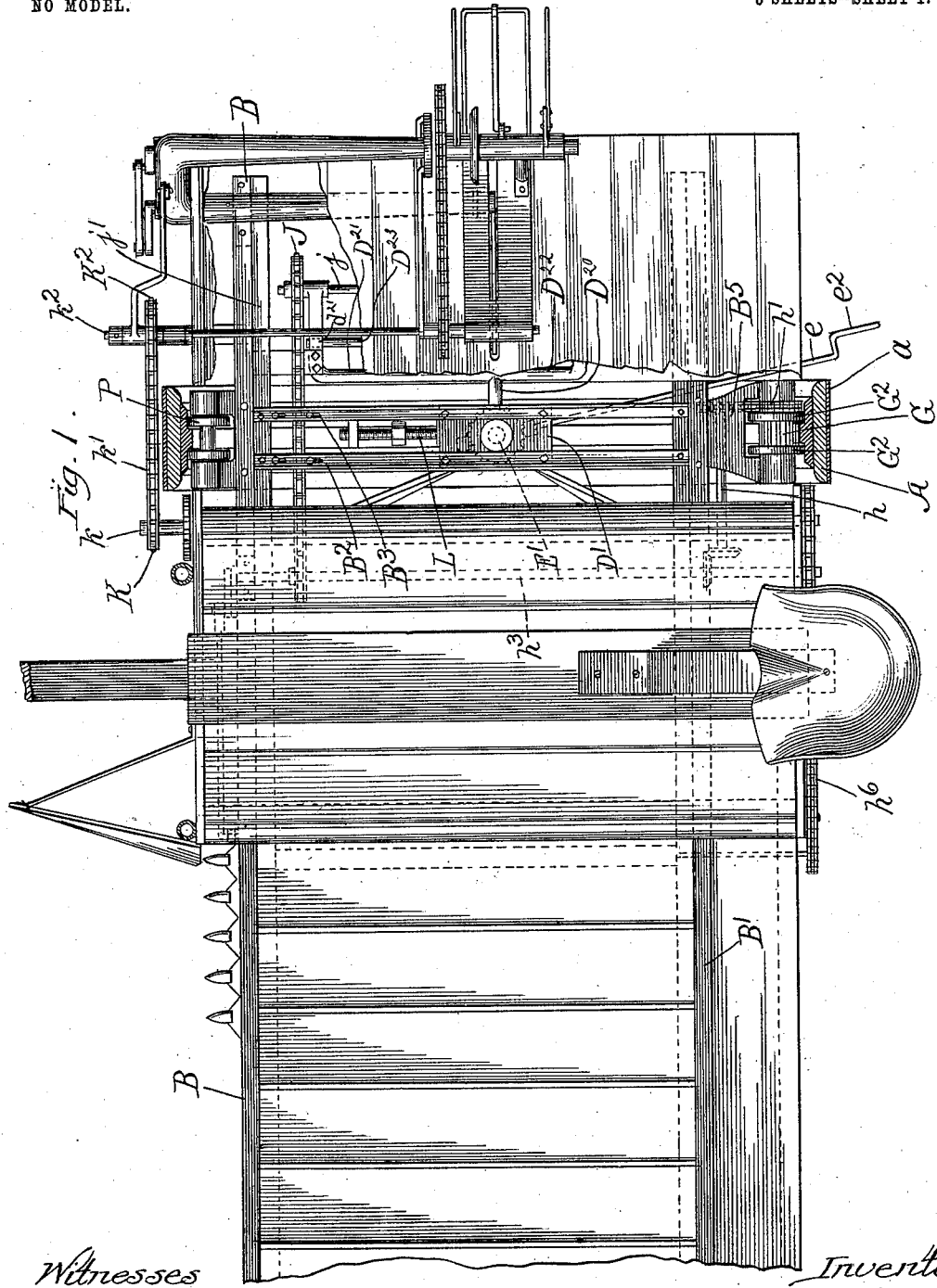

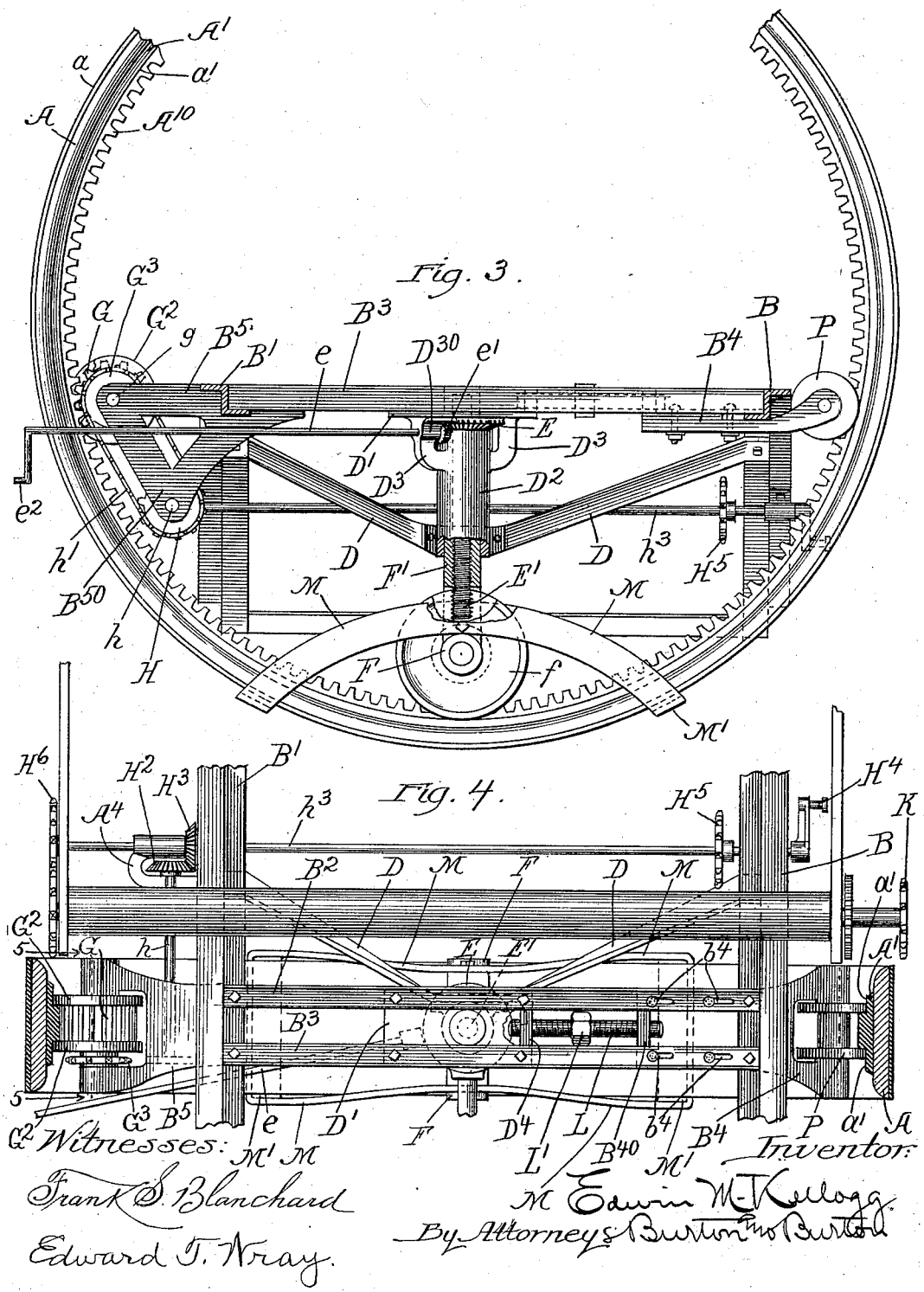

No. 757,126. Patented April 12, 1904.

UNITED STATES PATENT OFFICE.

EDWIN M. KELLOGG, OF MADISON, WISCONSIN, ASSIGNOR OF ONE-HALF TO WILLIAM C. THOMPSON, OF CHICAGO, ILLINOIS.

GRAIN-HARVESTER.

SPECIFICATION forming part of Letters Patent No. 757,126, dated April 12, 1904.

Application filed March 4, 1899. Serial No. 707,753. (No model.)

*To all whom it may concern:*

Be it known that I, EDWIN M. KELLOGG, a citizen of the United States, residing at Madison, county of Dane, and State of Wisconsin, have invented certain new and useful Improvements in Grain-Harvesters, which are fully set forth in the following specification, reference being had to the accompanying drawings, forming a part thereof.

The purpose of this invention is to provide an improved construction for harvester arranged to deliver the grain from conveying mechanism at one side of the machine to the binder at the opposite side by passing it directly through an open-center traction-wheel, and, specifically, to provide means for raising and lowering the main frame of a harvester so constructed and for making the frame exceptionally rigid throughout the entire extent, and particularly at the part which extends through the wheel.

It consists, in addition to the features of construction which attain these general results, of specific features set out in the claims.

In the drawings, Figure 1 is a partly-sectional plan of my improved harvester having the grainward portion of the rear platform broken away, the traction-wheel being shown in horizontal axial section and a portion of the deck being broken away. Fig. 2 is a rear elevation showing, substantially, the entire machine except a grainward portion of the platform and reel, the traction-wheel being cut away from the tread-point on the ground to a point above the center at the rear to disclose the mechanism within it. Fig. 3 is a stubble-side elevation of the traction-wheel, the main frame and devices for supporting it within the wheel being shown in proper relation thereto, partly sectional to show the means of raising and lowering. Fig. 4 is a detail plan of the frame and mechanism thereon adjacent to the grain side of the wheel, the wheel itself being shown in horizontal axial section, the main frame-bars and connections being broken away a little distance from the wheel on either side. Fig. 5 is a detail section at the line 5 5 on Fig. 4. Fig. 6 is a detail elevation of the upper end portion of a sleeve, in which are journaled shafts having coöperating gears for raising and lowering the main frame within the traction-wheel.

A is the traction-wheel, which consists of a tread-rim $a$ and the gear and track ring A' within the tread-rim. The main frame comprises front and rear sills B and B', made of Z-shaped iron bar, each sill being continuous from grain to stubble side of the machine, the two bars being parallel substantially throughout, each comprising a horizontal portion extending under the platform, an upwardly-inclined portion $b'$, supporting the elevating mechanism, a short horizontal portion $b^2$, extending through the wheel, and a downwardly-inclined portion $b^3$, which supports the binder at the stubble side of the wheel. These two sills are rigidly secured together by fore-and-aft tie-bars at any convenient points, but particularly by the tie-bars $B^2$ and $B^3$, which extend from sill to sill and are rigidly secured thereto within the traction-wheel. The tie-bars $B^2$ and $B^3$ are themselves rigidly bound together by the bracket $B^5$ at the rear end, said bracket being suitably shaped to seat under and against and be secured to the rear sill, as well as to the tie-bars $B^2$ and $B^3$, and also by the bracket $B^4$ at the forward end, which is adjustably fastened to both the tie-bars and extends forward underneath the forward sill, protruding in front of said sill, and carries at its forward end, which is forked for the purpose, the stay-wheel P, which is suitably grooved to adapt it to stride the gear-rim $A^{10}$ and ride upon the tracks $a'$ $a'$ at opposite sides thereof.

Made rigid with the main frame by means to be described there is a foot-wheel standard comprising a head-plate or flange D' and the trunk $D^2$, which is connected to the head-plate D' by bracket-arms $D^3$. The trunk $D^2$ is tubular, and telescoped within it is the stem E' of the foot-wheel-bearing fork F. The bracket-arms $D^3$ uphold the head-plate a sufficient distance above the upper end of the trunk $D^2$, which terminates between the bracket-arms, to allow room for the beveled gear E, whose shaft E' is upwardly stopped by the head-plate and connected with the gear, so as to rotate or be rotated therewith, and at the lower part is threaded and screwed into the stem or spindle F' of the foot-wheel fork F, between whose fork-arms at the lower end there is journaled the deeply-grooved foot-wheel $f$, which travels on the tracks $a'$ on both sides of the gear-rim $A^{10}$ of the track-ring A', the gear-rim extending into the deep groove of the foot-wheel. The lower end of the trunk $D^2$ is braced by the arms D D, which extend obliquely grainward and upward, one forward and the other rearward to the sills B' and $B^2$, respectively, to which the grainward ends of said arms D D are bolted fast near the upper end of the inclined portion $b'$ of said sills. In the brackets $B^5$ there is journaled the shaft $g$, rigid with which is the main pinion G, which meshes with the gear-rim $A^{10}$. Loose on the shaft $g$, between the pinion G and the ears or arms of the bracket $B^5$, there are wheels or disks $G^2$ $G^2$, constituting a stay-wheel and traveling on the tracks. On one of the bracket-arms $D^3$ there is formed a horizontal bearing $D^{30}$ for a shaft $e$, which at its inner end carries a pinion $e'$ inside of the bracket-arm and meshing with the beveled gear E. The boss $D^{30}$ is radial to the shaft E', but oblique to the plane of the traction-wheel, so that the shaft $e$, extending out beyond the circumference of the traction-wheel, passes the lateral margin thereof at the stubble side and terminates in a crank-handle $e^2$, by which it may be rotated at will, causing the screw-shaft E' to be rotated and screwed into or out of the spindle of the foot-wheel fork. By this means the main frame is raised and lowered bodily within the wheel. On the shaft $g$ there is rigid a sprocket-wheel $G^3$, and on the downwardly-extended arm $B^{50}$ of the bracket $B^5$ there is journaled a shaft $h$, for which another bearing is provided in a hanger $A^4$, which is fastened to the inclined portion $b'$ of the rear sill. On the shaft $h$ is a sprocket-wheel H, which is driven by the chain $h'$, passing around the sprocket-wheel $G^3$ and said sprocket-wheel H, and by this means power is communicated to the shaft $h$, which, by any suitable train of mechanism, communicates driving power to the several trains or parts of the mechanism of the harvester. As illustrated, there is a beveled gear $H^2$ on the grainward end of the shaft $h$, which meshes with the bevel-gear $H^3$ on a fore-and-aft shaft $h^3$, and said shaft $h^3$ at the forward end carries the sickle-actuating crank $H^4$ in front of the forward sill and has a sprocket-wheel $H^5$ at the rear of said sill from which power is taken to drive the packer-shaft $j$, the chain $j'$ for communicating said power extending through the drive-wheel underneath the main frame onto the sprocket-wheel J on the packer-shaft. At the rear end of the shaft $h^3$ is a sprocket-wheel $H^6$, from which, by means of the chain $h^6$, power is communicated to the elevator and conveyer shafts. On the forward end of the shaft $k$ of the delivery-roller of the upper conveyer-apron is a sprocket-wheel K, from which, by means of the chain $k'$, driving a sprocket-wheel $K^2$ on the forward end of the shaft $k^2$, power is communicated to the upper binder-train. The chain $k'$ extends outside the traction-wheel.

It will be understood that the binder is designed to be, and may be arranged to be, adjusted fore and aft in any customary manner to afford the lower support for the binder in question. I extend from the trunk $D^2$ stubbleward an arm $D^{20}$, which forks after passing beyond the vertical fore-and-aft plane of the stubbleward side of the drive-wheel to form arms $D^{21}$ and $D^{22}$, which extend, respectively, forward and rearward and afford seats at $d^{21}$ and $d^{22}$, respectively, for the bar $D^{23}$, which is rigid with the binder-frame and slides through the seats $d^{21}$ and $d^{22}$ as the binder is moved fore and aft, in a manner well understood.

When the main frame is raised from the lowest position at which it is shown in Fig. 3, the main pinion G might be carried out of mesh with the gear-rim $A^{10}$ by reason of passing into a wider portion of the wheel—that is, nearer a diametric plane—and to compensate for the change in this respect the bracket $B^4$ is made adjustable at its fastening to the main frame, as shown by the elongated slots $b^4$ $b^4$ in the cross-ties $B^2$ and $B^3$, through which the bolts pass which secure said bracket to the cross-ties. The bracket has a lug $B^{40}$, and the head-plate D' of the standard D has a similar lug $D^4$, both lugs projecting upward between the ties $B^2$ and $B^3$. Both lugs are apertured and one of the apertures given an interior right-hand thread, the other having an interior left-hand thread, adapting them, respectively, to receive the opposite end portions of a right-and-left-threaded bolt L, which is provided intermediate its ends with suitable polygonal boss L', adapted to receive a wrench, whereby the device operates as a turnbuckle to protrude or retract the bracket $B^4$ and increase or diminish at will the horizontal distance between the stay-wheel P and the opposite stay-wheels $G^2$ on the shaft of the main pinion G. By this means the pinion may be at all times retained properly meshed with the gear-rim $A^{10}$. The range of adjustment contemplated is an equal number of inches above and below the center of the wheel, requiring thus the minimum compensatory adjustment of the stay-wheel.

I claim—

1. In a harvesting-machine, in combination with an open-center traction wheel or ring, the main frame extended therethrough and having a rigid, tubular trunk, $D^2$, within the wheel, a tubular, interiorly-threaded sleeve in such trunk, having at its lower end a fork; a foot-wheel journaled in such fork and tracking on the interior of the traction-wheel rim; a screw-shaft extending within said interiorly-threaded sleeve, stopped at its upper end on the frame, and having at said end a horizontal beveled gear, rotated with it; a shaft journaled in the trunk, and a pinion on said shaft meshing with said beveled gear, the shaft being extended past the wheel-rim, substantially as and for the purpose set forth.

2. In a grain-harvester, in combination with an open-center traction-wheel, a main frame extending therethrough; a foot-wheel and two stay-wheels tracking on the interior of the traction-rim, and arms on the frame on which said foot-wheel and stay-wheels have their bearings, the foot-wheel bearing being adjustable to vary its distance from the line which connects the stay-wheel bearings, one of the stay-wheel bearings being adjustable to vary its distance from the other.

3. In a grain-harvester, in combination with an open-center traction-wheel, the main frame extending therethrough; a foot-wheel and stay-wheels tracking on the interior of the traction-rim; arms on the main frame on which said foot and stay wheels respectively are journaled, the foot-wheel-bearing arm comprising a sleeve and the wheel-bearing stem telescoped with the sleeve, said stem being tubular and interiorly threaded and a screw-shaft screwed thereinto, and a wheel at the upper end of such screw-shaft, and means for rotating it at will, whereby the foot-wheel arm may be extended and contracted to raise and lower the frame within the wheel.

4. In a harvesting-machine, in combination with an open-center traction-wheel, the main frame extending therethrough, a foot-wheel and two stay-wheels tracking on the interior of the traction-wheel; a gear-pinion concentric with one of the stay-wheels, and a gear-rim on the interior of the traction-wheel with which the gear-pinion meshes; arms on which said foot and stay wheels are journaled, the foot-wheel arms being extensible, and suitable means for extending and contracting it, and one of the stay-wheel arms being adjustable to vary its distance from the other.

5. In a harvesting-machine, in combination with an open-center traction-wheel, a main frame extending therethrough, a binder-frame supported on the main frame outside the traction-wheel; an arm extending downwardly from the main frame within the traction-wheel, and an arm jutting rigidly therefrom and forking fore and aft, and a bar rigid with the binder-frame, supported in the extremities of said fork-arms adapted to slide therethrough fore and aft.

6. In a harvesting-machine, in combination with an open-center traction-wheel, the main frame having its front and rear sills extending therethrough; a binder mounted on the main frame outside the traction-wheel; the traction-rim having an interior gear-rim; a main pinion on the main frame meshing with such gear-rim, and the power-train of the machine connected with said pinion; the binder mechanism comprising the packer-shaft underneath the deck, and power-communicating connections for driving the same extending thereto through the traction-wheel; the main binder-shaft and train for driving the same above the deck, and power-communicating connections extending thereto past the traction-wheel outside thereof.

7. In a harvesting-machine having an open-center traction-wheel encompassing the frame fore and aft, the frame extending through such wheel and having a foot-wheel tracking on the interior of the open-center traction-wheel; a hanger extended from the bearing or support of the foot-wheel and engaging a flange of the traction-wheel to prevent the latter from falling away from the foot-wheel.

8. In a harvesting-machine having an open-center traction-wheel and the frame extending through the open center and encompassed fore and aft by the traction-wheel, a foot-wheel on the frame tracking on the interior of the traction-wheel to support the frame within the wheel, and a saddle or yoke having arms extending fore and aft from the bearings of the foot-wheel past the tread-rim at both sides, and thence transversely outside the tread-rim.

In testimony whereof I have hereunto set my hand, in the presence of two witnesses, at Chicago, this 2d day of March, 1899.

EDWIN M. KELLOGG.

Witnesses:
 CHAS. S. BURTON,
 JEAN ELLIOTT.